United States Patent [19]
Back

[11] 4,380,380
[45] Apr. 19, 1983

[54] EPISCOPIC PROJECTOR

[76] Inventor: Frank G. Back, 5596 Soledad Mt. Rd., La Jolla, Calif. 92037

[21] Appl. No.: 272,506

[22] Filed: Jun. 11, 1981

[51] Int. Cl.³ .............................................. G03B 21/06
[52] U.S. Cl. ........................................ 353/66; 353/38
[58] Field of Search ...................... 353/23, 24, 63–67, 353/38

[56] References Cited

U.S. PATENT DOCUMENTS

| | | | |
|---|---|---|---|
| 2,647,437 | 8/1953 | Bentley et al. | 353/67 |
| 3,051,041 | 8/1962 | Lehmann et al. | 353/66 |
| 3,064,523 | 11/1962 | Meltzer | 88/24 |
| 3,915,567 | 10/1975 | Altman | 353/120 |
| 3,951,535 | 4/1976 | Altman | 353/65 |
| 4,261,657 | 4/1981 | Reiback | 353/65 X |

FOREIGN PATENT DOCUMENTS

| | | | |
|---|---|---|---|
| 28013 | 2/1980 | Japan | 353/67 |
| 514632 | 11/1939 | United Kingdom | 353/66 |

*Primary Examiner*—Harry N. Haroian
*Attorney, Agent, or Firm*—A. F. Kronman

[57] ABSTRACT

An episcopic projector in which a field flattening lens located beneath the copy plane is used to direct light incident the copy and reflected from the copy through a Fresnel lens of relatively long focal length. An intermediate mirror is used for left right correction and the Fresnel lens is mounted so that it may be focused by simply moving it along the optical axis of the system.

9 Claims, 5 Drawing Figures

U.S. Patent   Apr. 19, 1983   4,380,380
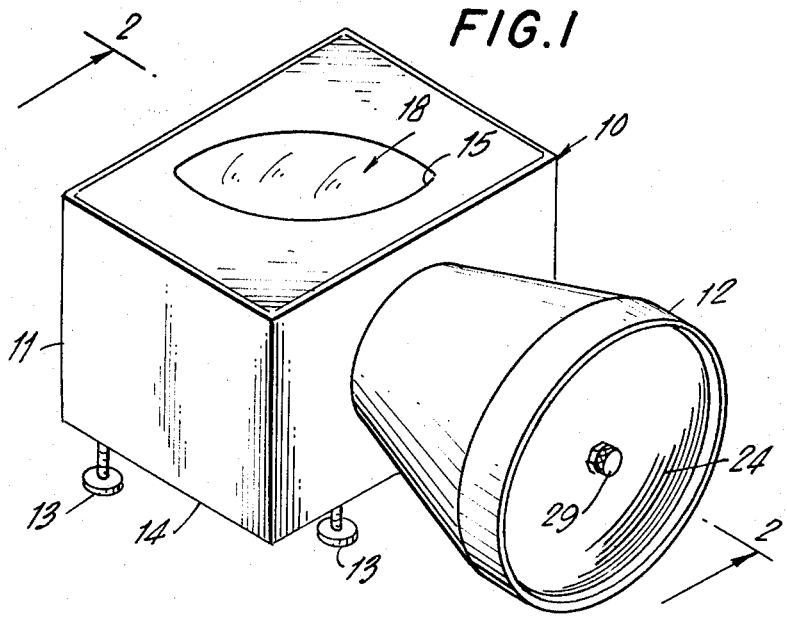
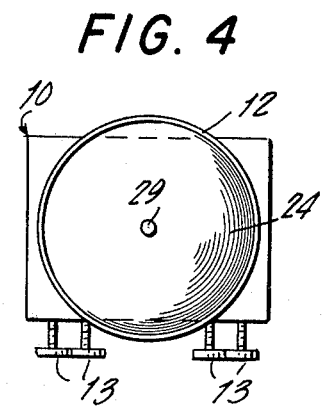
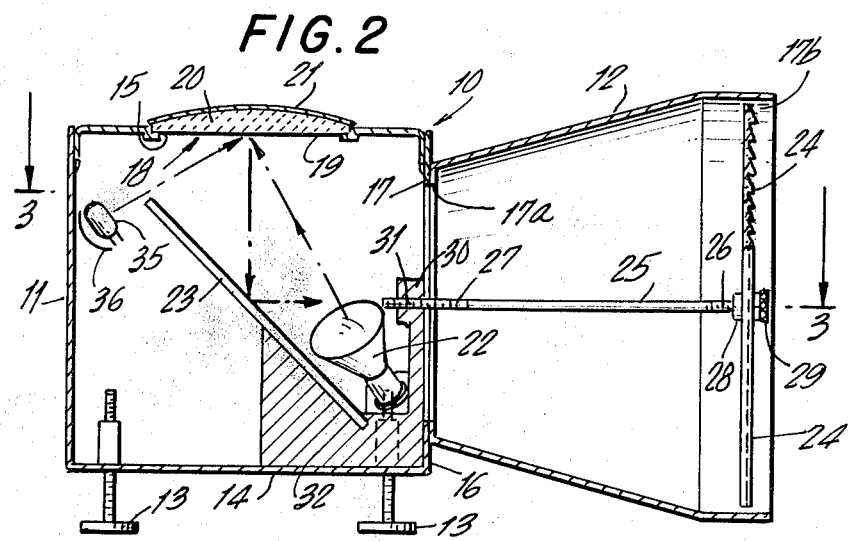
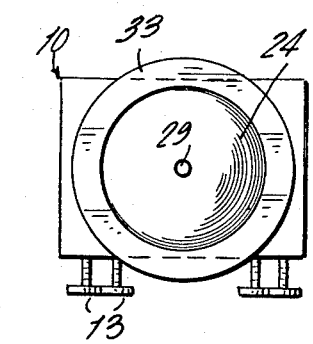
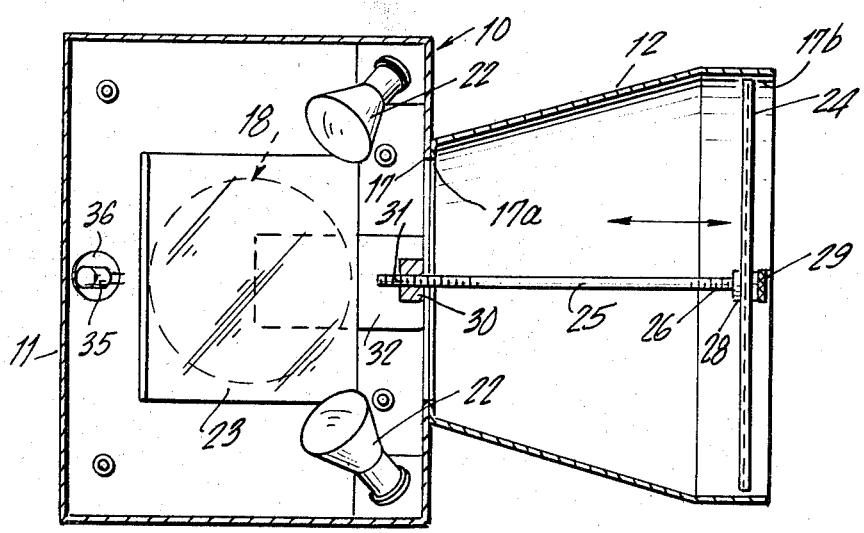

EPISCOPIC PROJECTOR

BACKGROUND OF THE INVENTION

Episcopic projectors in which imaging is produced by light reflected from a copy sheet, have in the past required high intensity illumination to produce a satisfactory projected image. The high intensity lamps which have been used are not only expensive but produce a substantial amount of heat which in turn creates problems requiring heat absorbing elements and other devices such as cooling fans, light shields, etc. all of which add to the eventual cost of the device. In addition, such prior art devices have employed sophisticated lens assemblies in order to control the light passing through the system.

SUMMARY

The present invention proposes to overcome the difficulties of prior art devices by the use of a large field flattening lens to receive the copy to be projected thereon, a light source of relatively low wattage to illuminate the copy, and a mirror for left right correction to receive the light coming from the copy and direct it through a Fresnel lens which acts as the projection lens of the device.

BRIEF DESCRIPTION OF THE DRAWINGS

In the accompanying drawing forming part hereof similar elements have been given the same reference number, in which drawing:

FIG. 1 is a somewhat isometric view of a complete embodiment of the present invention.

FIG. 2 is a cross sectional view taken on line 2—2 in FIG. 1.

FIG. 3 is a sectional view looking in the direction of the arrows taken on line 3—3 in FIG. 2.

FIG. 4 is a view in front elevation, on a reduced scale of the episcopic projector shown in FIG. 1.

FIG. 5 is a view similar to FIG. 4 showing a reduced aperture option.

DETAILED DESCRIPTION

Referring to the drawings and particularly FIGS. 1-3, there is shown a episcopic projector 10 consisting of a hollow enclosure, hereinafter referred to as a lamp housing 11. The lamp housing is made of metal, plastic, or any other opaque material. A second hollow enclosure, hereinafter referred to as a lens housing 12, is secured to the lamp housing 11. The lamp housing is open at each end as shown at 17a and 17b. Opening 17a communicates with the interior of the lamp housing by means of opening 17, as best shown in FIG. 2.

The lens housing 11 is provided with height adjusting legs 13 which are threaded into and extend from the bottom 14 of said housing. The legs 13 can raise or tilt the episcopic projector as desired.

The top of the lamp housing is provided with a window 15 in which there is fitted a convex lens which may be a plano-convex lens such as is shown in FIG. 2 at 18. The lens 18 has its flat surface 19 facing the interior of the lamp housing 11. The upper or curved surface 20 of the plano-convex 18 lens serves to receive the copy 21 of the material to be projected. The convex lens in the present invention serves as a field flattener.

A light source such as the spaced lamps 22 is secured within the lamp housing 11 as best shown in FIGS. 2 and 3. In one embodiment of the invention the lamps 22 consist of two fifty watt lamps having internal reflectors theein such as are well-known in the lighting art. The lamps are directed so that their light passes through the plano-convex lens 18. The light passing through the lens 18 illuminates the surface of the copy 21 and is reflected from said surface back through the plano-convex lens onto an angularly disposed mirror 23 within the lamp housing 11. Light from the mirror 23 is reflected through the front opening 17 in the lamp housing 11 and then into the lens housing 12.

The lens housing 12 opening 17b at its front or exit end receives a Fresnel lens 24. The Fresnel lens is mounted upon an elongated rod 25 which is threaded at each end as indicated at 26, 27. The Fresnel lens is secured to the rod 25 by means of a nut 28 and an opposed control knob 29. The rod 25 is threaded into an upstanding vane 30 as shown at 31. The vane 30 is secured to or made part of the mirror support 32 which is attached to the bottom 14 of the lamp housing 11. By grasping the control knob 29 and rotating it, the operator can adjust the Fresnel lens along the optical axis of the episcopic projector for focusing purposes. It is to be understood, that the Fresnel lens is of a type, well-known in the art, which will bring the image to a focus at a desired distance from the front of the projector for viewing upon a screen (not shown).

The optical system of the episcopic projector 10 has been greatly simplified by the use of the convex lens 18. This lens acts as a field lens and corrects astigmatic and field curvature problems which have previously required expensive multi-element lens systems. Since Fresnel lenses can be made without spherical aberration and of plastic material of low dispersion, long focal length Fresnel lenses have basically only a light field curvature as their main aberration. The light weight of the plastic Fresnel lens, in addition to reducing the cost of the projector permits it to be mounted on the thin rod 25 as shown in the present embodiment. It is within the purview of the present invention, however, to have the Fresnel lens received within a threaded portion 34 of the housing 12 so that it can be focused by rotating the knob 29 without need for the rod 25 or the vane 30.

The Fresnel lens 24 is preferably an F.2 lens or faster and a focal length of the order of 300 mm to 500 mm. If desired a shield 33, shown in FIG. 5 may be slipped over the front of the housing 12. The shield 33 reduces the aperture size of the Fresnel lens to produce, for example, an F-3 condition.

The plano-convex lens 18 can be used with its flat side up rather than in the position shown, in which event a deeper lens is required. Other convex lens shapes, well known in the optical art may be used without departing from the spirit of the invention.

In lieu of the incandescent lamps 22, a single halogen lamp 35 such as a 40 volt 250 watt lamp and reflector 36 may be employed (see FIG. 2 and 3). The location of the halogen lamp near the top of the housing 11 and below the upper edge of the mirror serves to reduce surface reflections from the convex lens 18.

It has been found that with the simplified optical system herein described, high light efficiency of the order of ten times that possible with prior art projectors having the same wattage can be produced. The temperatures being comparatively low, the optics can be made of plastic which makes the entire unit light, uncomplicated and inexpensive.

Having thus fully described the invention what is desired to be claimed and secured by Letters Patent is:

1. An episcopic projector comprising an opaque hollow lamp housing having a top member, a bottom, a front, a back and opposed sides, a window in the top member, a field flattening lens in the top member window to receive an image source thereon, an opening in the front of the lamp housing, a lens housing having a rear and a front opening secured to the lamp housing with the opening at the rear of said housing in communication with the interior of the lamp housing, a light source carried within the lamp housing and directed at the field flattening lens, a Fresnel lens carried in the lens housing front opening to receive light reflected from the image source through the field flattening lens, an angularlary disposed mirror in the light path between the said lens and the Fresnel lens to receive the reflected light and direct it through the Fresnel lens and means to move the Fresnel lens along the optical axis of the projector to focus the Fresnel lens.

2. A projector according to claim 1 in which the field flattening lens is a plano-convex lens.

3. A projector according to claim 2 in which the Fresnel lens is axially supported upon one end of an elongated rod, an upstanding internally threaded vane is carried within the projector housings and the rod is threaded to be rotatably received within the vane threads.

4. A projector according to claim 1 in which the Fresnel lens has a relatively long focal length of the order of 300 mm.

5. A projector according to claim 2 in which the light source comprises spaced lamps on either side of the mirror.

6. A projector according to claim 5 in which each of the lamps has a power of the order of fifty watts.

7. A projector according to claim 1 in which the Fresnel lens is a plastic lens.

8. A projector according to claim 1 in which the Fresnel lens is at least an F2.00 lens.

9. A projector according to claim 1 in which the light source is a halogen lamp located near the top of the housing.

* * * * *